United States Patent [19]

Takahashi

[11] Patent Number: 4,993,892
[45] Date of Patent: Feb. 19, 1991

[54] THREAD CUTTING THROW-AWAY TIP

[75] Inventor: Nobuhiro Takahashi, Hyogo, Japan

[73] Assignee: Sumitomo Electric Industries, Ltd., Osaka, Japan

[21] Appl. No.: 396,663

[22] Filed: Aug. 22, 1989

[30] Foreign Application Priority Data

Aug. 25, 1988 [JP] Japan ............................ 63-111347[U]

[51] Int. Cl.$^5$ .............................................. B23P 15/28
[52] U.S. Cl. ..................................... 407/114; 407/116; 407/115
[58] Field of Search ................. 407/113, 114, 116, 115

[56]  References Cited

U.S. PATENT DOCUMENTS

| | | | |
|---|---|---|---|
| 3,786,540 | 1/1974 | Lundgren | 407/113 |
| 3,786,541 | 1/1974 | Lundgren | 407/113 |
| 3,792,515 | 2/1974 | Lundgren | 407/113 |
| 3,947,937 | 4/1976 | Hertel | 407/114 |
| 4,575,888 | 3/1986 | Murén | 407/113 |
| 4,629,371 | 12/1986 | Maeda et al. | 407/114 |
| 4,669,925 | 6/1987 | Lowe et al. | 407/113 |
| 4,674,924 | 6/1987 | Carlsson et al. | 407/114 |
| 4,681,487 | 7/1987 | Pettersson | 407/113 |
| 4,681,488 | 7/1987 | Markusson | 407/113 |
| 4,685,844 | 8/1987 | McCreery et al. | 407/115 |
| 4,743,144 | 5/1988 | Shikata | 407/113 |

*Primary Examiner*—Frederick R. Schmidt
*Assistant Examiner*—Lawrence Cruz
*Attorney, Agent, or Firm*—Cushman, Darby & Cushman

[57]  ABSTRACT

A throw-away thread cutting insert having a cutting tip at a corner part thereof corresponding to a shape of a thread groove, a lead groove formed in an upper surface of the insert and disposed adjacent to and inwardly of said cutting tip, and a curl recess formed in an upper wall of the insert in continuous relation to one side wall of the insert and disposed inwardly of said lead groove.

8 Claims, 2 Drawing Sheets and inwardly of said cutting tip, the lead groove being recessed to a level below the cutting tip, and a curl recess formed in an upper wall of the insert in continuous relation to one side wall of the insert and disposed inwardly of said lead groove, the curl recess being deeper than the lead groove and being continuous with the lead groove, and the curl recess having a side wall opening formed by removing part of an upper portion of the one side wall of the insert.

It is preferable that the side wall opening is provided at a thread leading side of the insert.

In the throw-away thread cutting insert according to the present invention, chips produced by the cutting tip are guided by the lead groove and led to the curl recess so that the chips are continuously curled by the curl recess. Since the curl recess opens to one side wall of the insert, a chip is curled into a helical shape and is removed from this side wall opening.

The chip can effectively be removed to the thread leading side of the tip.

THREAD CUTTING THROW-AWAY TIP

FIELD OF THE INVENTION

The present invention relates generally to a throw-away thread cutting insert for use in a cutting tool, and more particularly, to a throw-away thread cutting insert which is suitable for chasing threads and is improved in removal of chips while chasing threads.

BACKGROUND OF THE INVENTION

In chasing threads, just as in other cutting operations, it is desirable to break each chip into small pieces so that the chip will not be wound around the cutting tool or workpiece. However, under conditions in which a depth of cut is extremely small and a feed rate is high, a chip does not readily break, and trying to forcibly break the chip by a chip breaker or the like, increases the cutting resistance undesirably. As a result, if the cutting tool or thread cutting insert is made of a material having an inferior rigidity, the cutting tool may be subjected to abnormal vibration, which lowers the machining accuracy.

For this reason, a conventional throw-away thread cutting insert 51, as shown in FIG. 1, either has no chip breaker or has a groove 53 provided near each cutting tip 52 in a manner to separate the cutting edge 52 from the insert body. However, in such a throw-away insert 51, it has been impossible to break a chip into small pieces, to control the direction of guide and removal of the chip or to stabilize the curling of the chip. Thus, the elongated chip undesirably winds around the cutting tool, the workpiece or the like.

In view of the above difficulty and problem accompanying the conventional thread cutting insert, the present invention is a throw-away thread cutting insert in which a recess if formed in a rake surface so as to smoothly remove chips as disclosed in Laid-open Japanese Utility Model Application Nos. 63-113502 and 64-12705 (both unexamined).

However, in the throw-away insert disclosed in JUMA No. 63-113502, the recess is disposed rearwardly of the cutting tip at a distance therefrom and, therefore, the leading of chips from the cutting edge to the recess cannot be satisfactorily controlled. In the case of the throw-away insert disclosed in JUMA No. 64-12705, the recess is disposed near the cutting tip and, accordingly, although chips can be smoothly guided and led to the recess, the chips cannot satisfactorily be curled into a helical shape (i.e., a regular curl-shape) at the recess. Thus, the proposed thread cutting inserts having a recess still raise problems.

SUMMARY OF THE INVENTION

Accordingly, an object of the present invention is to eliminate the above-described difficulties accompanying conventional and proposed thread cutting inserts. More particularly, an object of the invention is to provide a throw-away thread cutting insert capable of smoothly guiding and leading chips produced during a thread cutting operation to a recess, and of stably removing each chip in a helical form.

The above and other objects have been achieved by the provision of a throw-away thread cutting insert which, according to the present invention, is provided with a cutting tip at a corner part thereof corresponding to a shape of a thread groove, a lead groove formed in an upper surface of the insert and disposed adjacent to

DESCRIPTION OF THE PREFERRED EMBODIMENT

Figure 1:
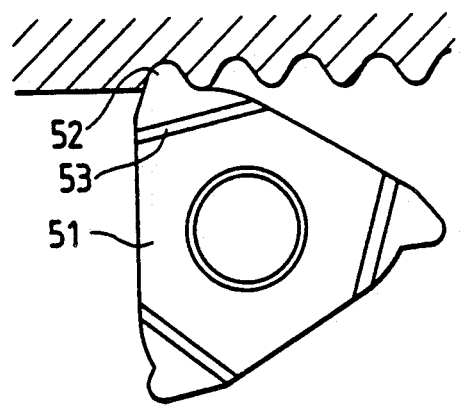
FIG. 1 is a plan view of the conventional thread cutting insert.
Figure 2:
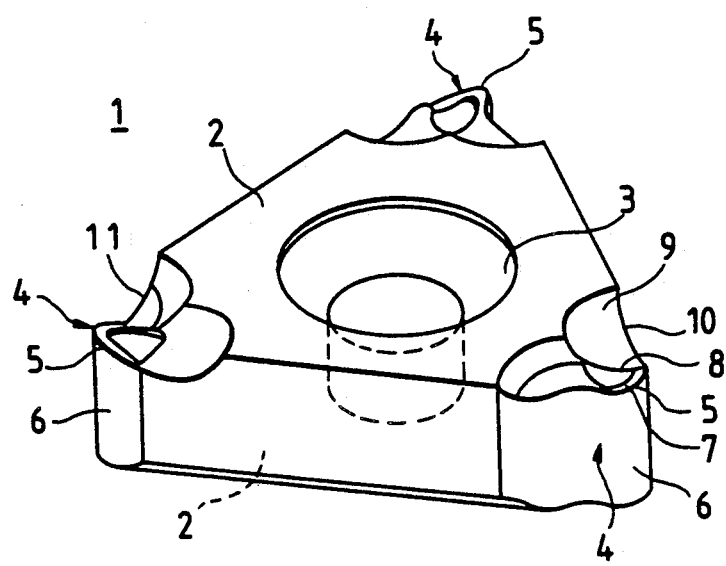
FIG. 2 is a perspective view of a preferred embodiment of a throw-away thread cutting insert.
Figure 3:
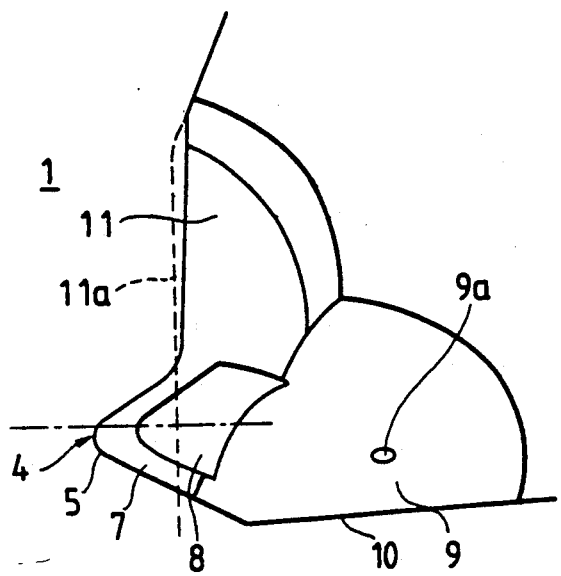
FIG. 3 is a partially enlarged plan view of the insert, showing a cutting edge portion.
Figure 4:
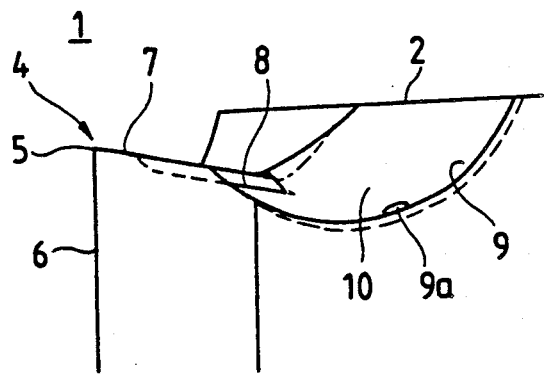
FIG. 4 is a side-elevational view of FIG. 3.
Figure 5:
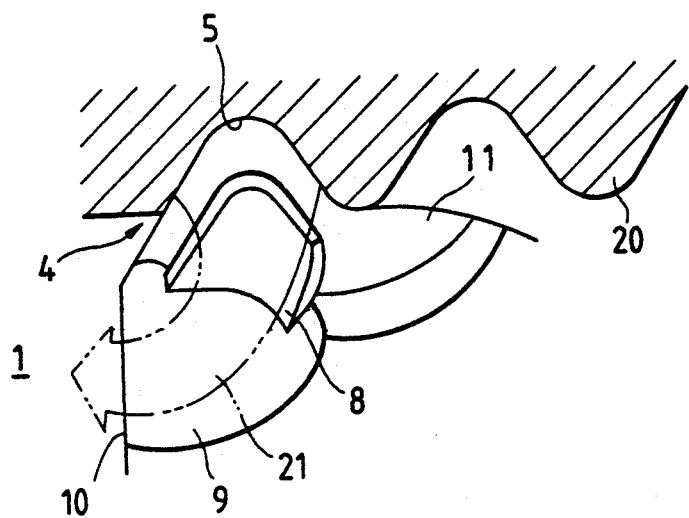
FIG. 5 is a schematic plan view showing the flow of a chip during the cutting operation.

A preferred embodiment of a throw-away thread cutting insert of the present invention will now be described with reference to the accompanying drawings where like reference numerals indicate like parts. FIGS. 2 to 5 show a preferred embodiment of a throw-away thread cutting insert of the present invention. FIG. 2 is a perspective view of the thread cutting insert. FIG. 3 is a partially enlarged plan view of the insert, showing its cutting portion. FIG. 4 is a side-elevational view of FIG. 3, and FIG. 5 is a schematic plan view, showing the flow of a chip during a chasing operation.

The throw-away thread cutting insert 1 (hereinafter referred to as "insert") comprises a thick plate of a substantially triangular planform shape formed from a cemented carbide, cermet, ceramic or the like. Both the upper and lower surfaces of the insert 1 have insert-supporting surfaces 2, respectively. A central aperture 3 for mounting the insert 1 on a tool holder of a cutting tool is formed through the insert 1 at its center portion. A cutting tip 5, having a shape corresponding to a shape of a thread groove of a workpiece, is defined by an outer peripheral wall of each corner portion 4 of the insert 1. A side wall of the corner portion 4 defines a relief surface 6 having substantially the same cross-section as the cutting tip 5. A lead groove 8 for guiding chips is formed in an upper surface of the insert 1 disposed adjacent to the cutting tip 5, the lead groove 8 slanting inwardly and downwardly toward a curl recess 9 (described later). A narrow land 7 extending along the first cutting tip 5 is formed between the first cutting tip 5 and the lead groove 8. An upper wall of the insert 1 adjacent to the cutting tip 5 is inclined inwardly downwardly. The lead groove 8 has a small depth, for example, of 0.05 to 0.5 mm. The curl recess 9 for curling chips is formed in the upper surface of the insert 1 at the thread leading side of the insert with the curl recess 9 being continuous with the lead groove 8 and being of a conical concave shape defined by an upwardly-diverging curved surface. The curl recess 9 is greater in depth than the lead groove 8 and is so formed that an upper portion of the side wall of the insert 1 disposed at the thread leading side is partially notched or removed. This notch defines a side wall opening 10.

The insert 1 is fixedly secured to a tool holder of a cutting tool by passing a bolt or the like through the central aperture 3. Then, the cutting tool is attached to a cutter device, the cutting tip 5 is abutted against a suitable workpiece 20, such as a round bar, and the workpiece 20 is fed at a predetermined speed in a thread chasing direction so that a thread groove is formed in the workpiece 20 by the cutting tip 5. During the formation of the thread groove, chip 21 is produced by the cutting tip 5, respectively. The chip 21 produced by the cutting tip 5 passes over the land 7 into the lead groove 8, and is guided by the lead groove 8 while being pushed by a subsequently-produced chip 21 into the curl recess 9. Then, the chip 21 impinges on an inclined surface of the curl recess 9. After that, the chip 21 is continuously curled upwardly into a helical shape, and finally discharged from the side wall opening 10 (provided in the side wall of the insert 1) in the thread leading direction.

The present invention is not limited to the substantially triangular plate mentioned above, but can be applied to plates of various polygonal shapes. The cutting tips can also be of any suitable shape corresponding to desired shapes or thread grooves.

A wall part 11 may selectively perform as a cutting wall. That is, during the thread cutting operation, a crest of the thread may selectively be cut by the wall part 11 in accordance with the rates of accuracy or surface roughness of the thread. In a case where the wall part 11 performs at a cutting wall, the wall part 11 is preferably formed perpendicularly to a bisector (one-dotted line in FIG. 3) of the cutting tip 5 cutting a trough of the thread as shown by the dotted line in FIG. 3.

As shown in FIGS. 3 and 4, the curl recess 9 has a bottom portion 9a. The bottom portion 9a of the curl recess 9 is preferably positioned at the thread leading side relative to the bisector of the thread cutting tip, so that the chip 21 can be smoothly guided and constantly led to the thread leading side.

Although the above-described embodiment shows the thread cutting insert having a central aperture 3, the present invention is not limited thereto or thereby. The invention can also be applied to a throw-away thread cutting insert of a clamp type having no central aperture.

As described above, in the throw-away thread cutting insert according to the present invention, the chip produced during the thread cutting or chasing operation is led into the curl recess through the lead groove, thus leading the chip in the predetermined direction so that the chip can be smoothly removed. At the same time, the chip is continuously curled upwardly by the curl recess and is discharged in a helical shape from the side wall opening. Therefore, the chip does not wind around the cutting tool or the workpiece, enhancing chip-removal efficiency and hence, productivity.

A case where the opening of the curl recess is formed in the side wall of the insert disposed at the thread leading side of the insert, the chip is curled into a helical shape toward the leading side of the insert and is discharged from this opening. Therefore, the chip is not brought into contact with the thread-cut portion of the workpiece and hence, does not damage this thread-cut portion. Therefore, high quality products having threads, such as screws or a bolts, can be produced efficiently, and the manufacturing cost of such products can be reduced.

What is claimed is:

1. A throw-away thread cutting insert having an upper wall and a plurality of side walls for use in a cutting tool, one of said side walls being a thread leading side wall, comprising:
   a cutting tip provided at a corner portion of said insert, said cutting tip corresponding to a shape of a thread groove of a workpiece;
   a trough-shaped groove formed in said upper wall of the insert, said groove being disposed adjacent to said cutting tip;
   a land disposed between said cutting tip and said groove, said land substantially surrounding said groove on three sides, said groove being deeper than said land; and
   a recess formed continuously with a fourth side of said groove, a bottom of said recess being positioned at the thread leading side or said cutting insert relative to a bisector of said cutting tip, said recess being provided with a side wall opening formed by chamfering a part of said upper wall and said thread leading side wall of said insert, said groove slanting inwardly downwardly toward said recess and said recess being deeper than said groove such that a cutting chip engages said groove before engaging said recess and said cutting chip is guided through said groove into said recess and out said side wall opening.

2. The throw-away thread cutting insert according to claim 1, wherein the depth of said groove is within a range between 0.05 mm to 0.5 mm.

3. The throw-away thread cutting insert according to claim 1, wherein said insert comprises a thick plate.

4. The throw-away thread cutting insert according to claim 3, wherein said insert is of polygonal shape.

5. The throw-away thread cutting insert according to claim 4, wherein said insert is of substantially triangular shape.

6. The throw-away thread cutting insert according to claim 1, wherein said insert is formed from a cemented carbide.

7. The throw-away thread cutting insert according to claim 1, wherein said insert is formed from cermet.

8. The throw-away thread cutting insert according to claim 1, wherein said insert is formed from ceramics.

* * * * *